United States Patent
Nagataki et al.

(10) Patent No.: US 9,689,663 B2
(45) Date of Patent: Jun. 27, 2017

(54) MULTI-JOINT ARM TYPE MEASUREMENT APPARATUS

(71) Applicant: MITUTOYO CORPORATION, Kawasaki-shi, Kanagawa (JP)

(72) Inventors: Yuichi Nagataki, Kawasaki (JP); Kentaro Nemoto, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 113 days.

(21) Appl. No.: 14/721,895

(22) Filed: May 26, 2015

(65) Prior Publication Data

US 2015/0345933 A1   Dec. 3, 2015

(30) Foreign Application Priority Data

May 30, 2014  (JP) .................................. 2014-113547

(51) Int. Cl.

| G01B 11/03 | (2006.01) |
|---|---|
| G01B 5/012 | (2006.01) |
| G01B 11/00 | (2006.01) |
| G01B 21/04 | (2006.01) |
| G01B 11/245 | (2006.01) |

(52) U.S. Cl.
CPC ............ G01B 11/007 (2013.01); G01B 5/012 (2013.01); G01B 11/245 (2013.01); G01B 21/047 (2013.01)

(58) Field of Classification Search
CPC ....... G01B 11/007; G01B 5/012; G01B 7/012
USPC .......................................... 33/503, 557, 560
See application file for complete search history.

(56) References Cited

U.S. PATENT DOCUMENTS

| 4,097,996 A * | 7/1978 | Yamazawa ............... G01B 5/02 33/1 M |
|---|---|---|
| 6,131,299 A * | 10/2000 | Raab ...................... G01B 21/04 33/503 |
| 6,253,458 B1 * | 7/2001 | Raab ................... G01B 5/0016 33/1 N |
| 7,246,030 B2 * | 7/2007 | Raab .................... G01B 11/007 702/150 |
| 7,395,606 B2 | 7/2008 | Crampton |
| 7,693,325 B2 * | 4/2010 | Pulla ..................... G01B 21/04 33/503 |
| 7,908,757 B2 * | 3/2011 | Ferrari ................... G01B 5/012 33/503 |
| 8,145,446 B2 * | 3/2012 | Atwell .................. B25J 9/1692 33/503 |
| 8,832,954 B2 * | 9/2014 | Atwell ................. G01B 11/005 33/503 |
| 8,898,919 B2 * | 12/2014 | Bridges ............... G01B 21/047 33/503 |

FOREIGN PATENT DOCUMENTS

| JP | 2005-517914 A | 6/2005 |
|---|---|---|
| JP | 2007-527323 A | 9/2007 |
| WO | 03/069266 A2 | 8/2003 |
| WO | 03/069277 A1 | 8/2003 |

* cited by examiner

*Primary Examiner* — Christopher Fulton
(74) *Attorney, Agent, or Firm* — Oliff PLC

(57) ABSTRACT

A multi-joint arm type measurement apparatus includes a plurality of probes mounted at a tip of a multi-joint mechanism, and a probe rotation holding mechanism configured to rotatably hold the other probe around one probe and to fix a rotating position of the other probe at a plurality of positions.

12 Claims, 6 Drawing Sheets

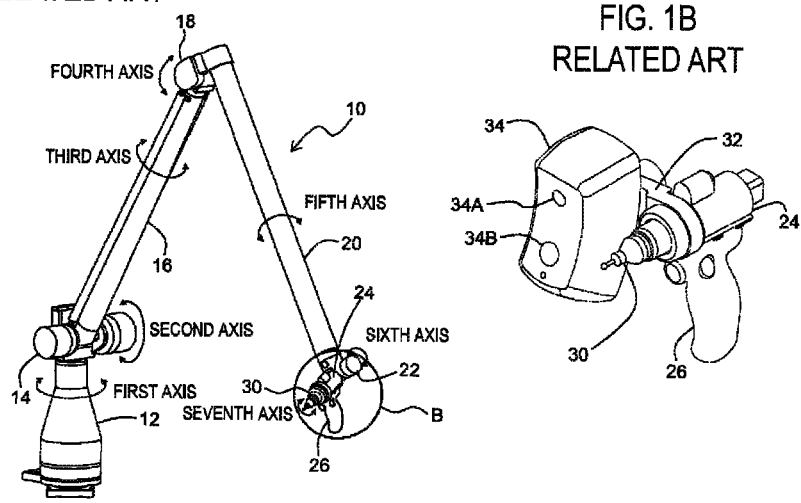
FIG. 1A RELATED ART
FIG. 1B RELATED ART
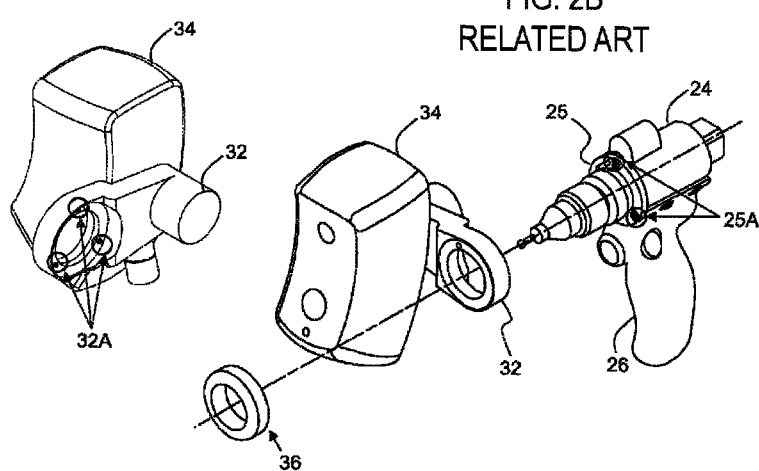
FIG. 2A RELATED ART
FIG. 2B RELATED ART

MULTI-JOINT ARM TYPE MEASUREMENT APPARATUS

CROSS-REFERENCE TO RELATED APPLICATION

The present application claims priority from Japanese Patent Application No. 2014-113547 filed on May 30, 2014, the entire content of which is incorporated herein by reference.

BACKGROUND

The present invention relates to a multi-joint arm type measurement apparatus. Particularly, the present invention relates to improvements on a multi joint arm type measurement apparatus having a plurality of probes (for example, a contact probe and a non-contact probe) mounted at a tip of a multi-joint mechanism and configured to appropriately use the probes depending on an area to be measured.

As exemplified in FIG. 1A, a multi joint arm type measurement apparatus having a multi-joint mechanism 10 has been known (Patent Documents 1 and 2). Here, the multi-joint mechanism 10 includes a base 12 fixed to a working table or tripod (not shown), a first arm 16 supported to the base 12 via a first joint 14, a second arm 20 supported to a tip of the first arm 16 via a second joint 18, an arm head 24 supported to a tip of the second arm 20 via a third joint 22, a grip 26 for enabling an operator to hold the arm head 24, a contact probe (also referred to as a hard probe) 30 such as a ball probe fixed to a tip of the arm head 24, and a rotation mechanism of seven axes shown in FIG. 1.

As specifically shown in FIG. 1B, an optical probe for performing extensive non-contact measurement in conformity to an area to be measured is attached to the arm head 24 via a laser attachment bracket 32. For example, the optical probe is a laser probe 34 in which reflected light of laser light, which is emitted from a laser illumination port 34A, is captured at an incident port 34B to obtain a sectional shape of the area to be measured by a light-section method.

In this way, the two probes 30, 34 are provided, so that it is possible to perform hybrid measurement of the high-precision contact measurement and the extensive non-contact measurement.

[Patent Document 1] Japanese Patent Application Publication No. 2005-517914A

[Patent Document 2] Japanese Patent Application Publication No. 2007-527323A

When fixing the laser probe 34 to the arm head 24, balls 32A provided at three portions of the back side of the laser attachment bracket 32, as shown in FIG. 2A, and rollers 25A provided at three portions of an attachment base 25 fixed to the arm head 24, as shown in FIG. 2B, are matched with each other and a laser probe fastening ring 36 is fastened (screw fastened) thereto, so that the laser attachment bracket 32 is fixed to the arm head 24.

However, when the fixing is made by the screw fastening, a relatively position is uniquely determined. Therefore, the laser probe 34 and a workpiece position overlap with each other, so that a workpiece may not be seen well. Also, when illuminating the laser in a lateral direction, it is necessary to perform the measurement with the grip 26 being positioned laterally. At this state, however, when the measurement is performed at a high position, the arm should be raised high. As a result, it is difficult to perform the measurement for a long time.

In the meantime, Patent Documents 1 and 2 disclose that the optical probe is configured to be relatively rotatable around the contact probe. However, since a relative rotation position is free and is not restrained, there is a concern that the rotation will be made during the measurement. As a result, it is not possible to perform the high-precision measurement.

SUMMARY

Exemplary embodiments of the present invention provide a multi joint arm type measurement apparatus which can improve its usability without deteriorating precision.

A multi-joint arm type measurement apparatus according to an exemplary embodiment of the invention comprises a plurality of probes mounted at a tip of a multi-joint mechanism; and a probe rotation holding mechanism configured to rotatably hold the other probe around one probe and to fix a rotating position of the other probe at a plurality of positions.

The probe rotation holding mechanism may comprise a ratchet mechanism configured to fix the rotating position of the other probe at the plurality of positions.

The probe rotation holding mechanism may comprise a rotary encoder configured to detect a rotating angle of the other probe relative to the one probe.

The probes may include a contact probe and a non-contact probe.

The probe rotation holding mechanism may be configured to rotate the non-contact probe around the contact probe.

The contact probe may be a ball probe, and the non-contact probe may be an optical probe.

According to the present invention, while the other probe is held to be rotatable around the one probe, the rotating position can be fixed at the plurality of positions. Therefore, it is possible to adjust a relative rotating position between the one probe and the other probe, depending on a positional relation between the probe and the workpiece, so that it is possible to improve the usability free of a dominant arm and the like. Further, the probe is not rotated during the measuring, so that the high-precision measurement can be performed.

BRIEF DESCRIPTION OF THE DRAWINGS

FIG. 1A is a perspective view illustrating an entire configuration of an example of a multi joint arm type measurement apparatus of the related art.

FIG. 1B is an enlarged perspective view illustrating a vicinity of an arm head having a laser probe attached thereto of the related art.

FIG. 2A is a perspective view for explaining a related-art method of fixing the laser probe to the arm head, as seen from a back side of a laser attachment bracket.

FIG. 2B is an exploded perspective view for explaining the related-art method of fixing the laser probe to the arm head, as seen from a front side of a laser attachment bracket.

DETAILED DESCRIPTION

Hereinafter, exemplary embodiments of the present invention will be described in detail with reference to the drawings. In the meantime, it should be noted that the present invention is not limited to the exemplary embodiments and descriptions of the exemplary embodiments. Also, the constitutional elements in the exemplary embodiments include the elements that can be easily conceived by one skilled in the art, the substantially same elements and the equivalent elements. Further, the constitutional elements in the exemplary embodiments may be appropriately combined and appropriately selected and used.

Figure 3:
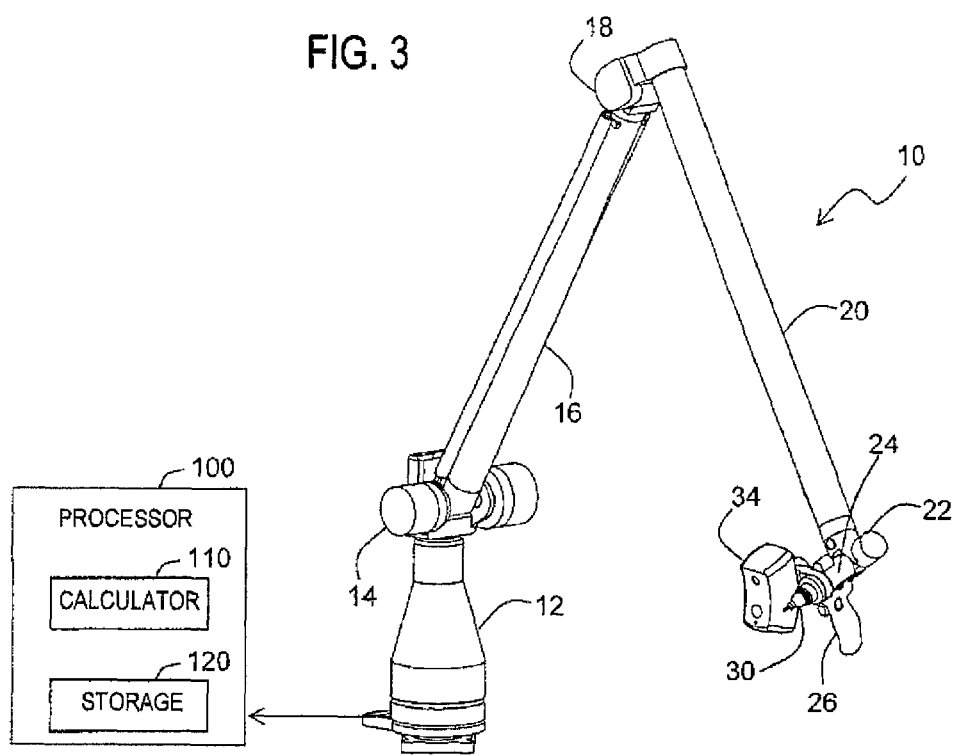
FIG. 3 is a perspective view including a partial block diagram, which illustrates an entire configuration according to a first exemplary embodiment of the present invention.

As shown in FIG. 3, a multi-joint arm type measurement apparatus to which the present invention is applied includes the same articulated arm mechanism 10 as the related art, and a processor 100. In the meantime, although not shown in the exemplary embodiments, a processing apparatus, a display apparatus and an input apparatus may be connected to the multi-joint arm type measurement apparatus. Also, when measuring a three-dimensional shape of a workpiece (not shown) with the multi-joint arm type measurement apparatus, an operator operates the multi-joint arm type measurement apparatus with gripping the grip 26 and manually moves the probes 30, 34. That is, the multi joint arm type measurement apparatus has a passive configuration where a driving source is not provided at axes of the multi-joint mechanism. The operator can bring the probes 30, 34 close to the workpiece together with a joint mechanism (description thereof is omitted) from a free direction, and can bring the same into contact with or close to the workpiece at a free angle.

The processor 100 has a calculator 110 and a storage 120. That is, the processor 100 can store a result calculated by the calculator 110 in the storage 120 or can call data stored in the storage 120 and calculate the same in the calculator 110. The processor 100 may be provided for the base 12, for example.

Figure 4A:
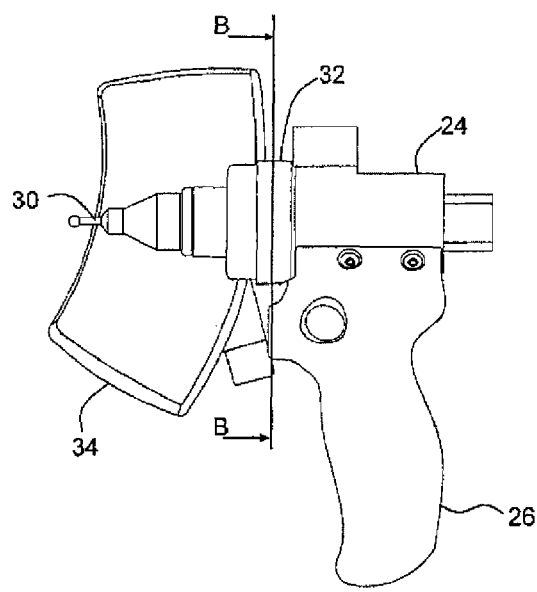
FIG. 4A is a side view of an arm head vicinity according to the first exemplary embodiment of the present invention
Figure 4B:
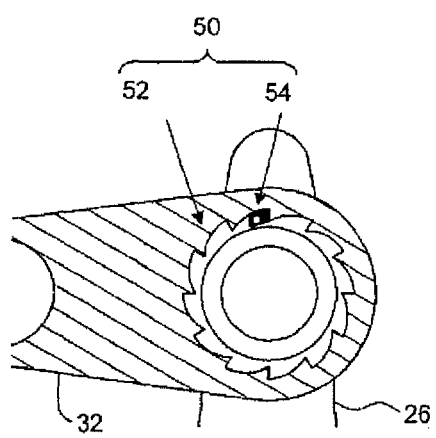
FIG. 4B is a cross sectional view taken along a line B-B of FIG. 4A.

According to a first exemplary embodiment of the present invention, a multi-joint arm type measurement apparatus having an entire configuration as shown in FIG. 3 is provided with a ratchet mechanism 50 having a gear 52 and a pawl 54 between the arm head 24 and the laser attachment bracket 32, as shown in FIG. 4B.

Figure 5A:
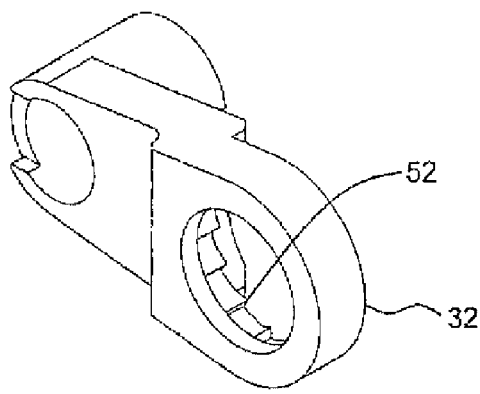
FIG. 5A is a perspective view of a laser attachment bracket according to the first exemplary embodiment of the present invention.
Figure 5B:
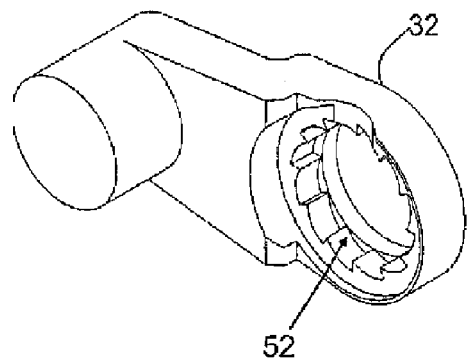
FIG. 5B is a perspective view, as seen from an opposite direction to FIG. 5A.

As shown in detail in FIGS. 5A and 5B, the gear 52 is formed on an inner peripheral surface of the laser attachment bracket 32, for example.

Figure 6:
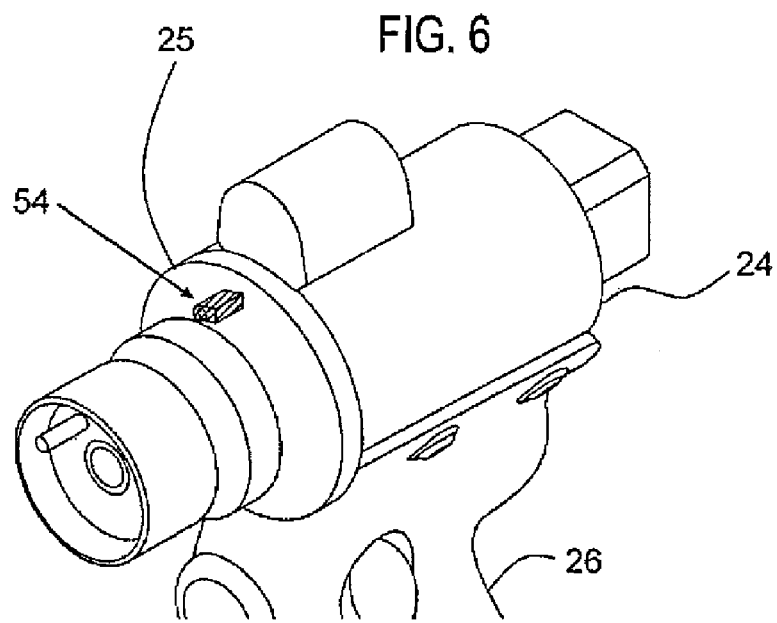
FIG. 6 is a perspective view illustrating a vicinity of the arm head according to the first exemplary embodiment of the present invention.

As shown in detail in FIG. 6, the pawl 54 is arranged on a surface of the attachment base 25 of the arm head 24, for example. In the meantime, the gear 52 and the pawl 54 may be arranged in a reverse relationship to the above.

Figure 7:
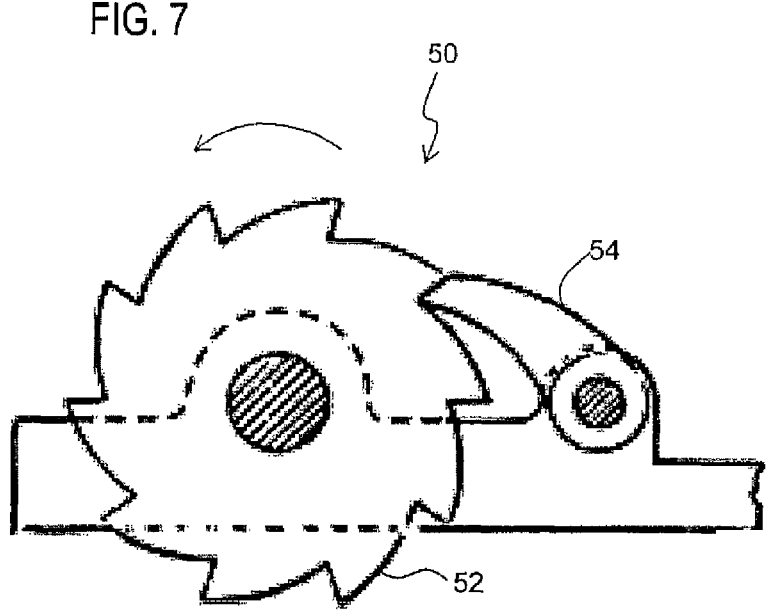
FIG. 7 is a conceptual view of a ratchet mechanism.
Figure 8A:
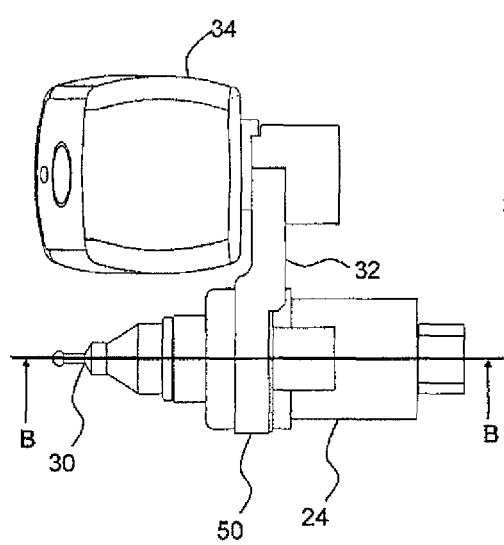
FIG. 8A is a plan view illustrating a vicinity of the arm head according to a second exemplary embodiment of the present invention.
Figure 8B:
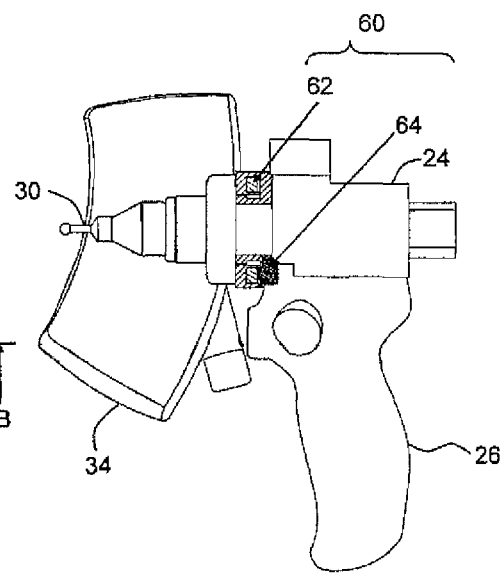
FIG. 8B is a longitudinal sectional view taken along a line B-B of FIG. 8A.
Figure 9:
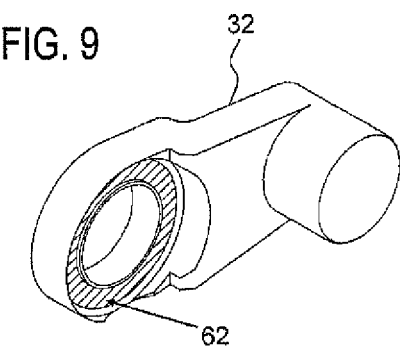
FIG. 9 is a perspective view of a laser attachment bracket according to the second exemplary embodiment of the present invention.
Figure 10A:
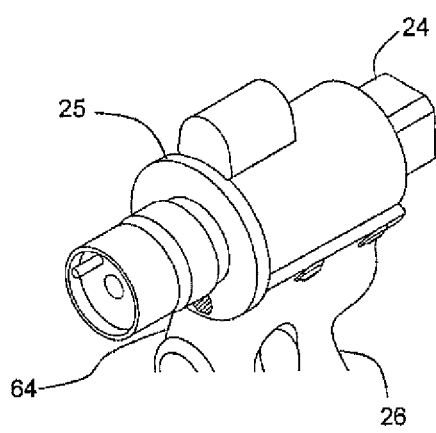
FIG. 10A is a perspective view of the arm head according to the second exemplary embodiment of the present invention.
Figure 10B:
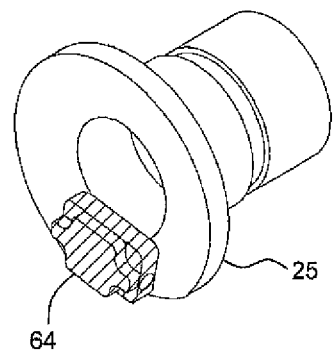
FIG. 10B is an enlarged perspective view illustrating a detector according to the second exemplary embodiment of the present invention.

The pawl 54 is arranged to stand against the gear 52. When the gear 52 is rotated in an appropriate direction (a counterclockwise direction denoted with an arrow, in FIG. 7), the pawl 54 easily gets over the teeth of the gear 52 and returns to an original position. In contrast, when the gear 52 intends to rotate in an opposite direction (a clockwise direction, in FIG. 7), a tip of the pawl 54 bites the gear 52, so that the gear 52 cannot rotate. In this way, it is possible to fix the laser attachment bracket 32 and thus the laser probe 34 at a predetermined position at which the tip of the pawl 54 falls at the lowest position of the gear 52.

Upon the measuring, it is necessary to acquire offset data between measured values of the contact probe 30 and the laser probe 34, as probe attaching position data (also referred to as probe posture data). However, whenever rotating the laser probe 34 and changing a measuring posture thereof, it is possible to again acquire the offset data. Alternatively, offset data about respective positions of the pawl 54 relative to the gear 52 of the ratchet mechanism 50 may be acquired and stored in a table, for example, and data indicating what number is a rotating position from a reference position may be stored. Thereby, the adjustment can be simplified. At this time, since a rotating direction has been determined for the ratchet mechanism, the association can be easily made.

Alternatively, like a second exemplary embodiment shown in FIGS. 8A, 8B, 9, 10A, and 10B, a rotating angle of the laser attachment bracket 32, i.e., the laser probe 34 relative to the arm head 24, i.e., the contact probe 30 may be detected by a rotary encoder 60 having a (rotary) scale 62 (refer to FIG. 9) incorporated into the laser attachment bracket 32 and a reflecting-type optical or electromagnetic detector 64 attached to the attachment base 25 of the arm head 24.

According to the second exemplary embodiment, qualification data is once acquired at any position. Thereby, even when the rotating position of the laser probe 34 is thereafter changed, it is possible to automatically calculate the qualification data from angle data detected by the rotary encoder 60.

Figure 11:
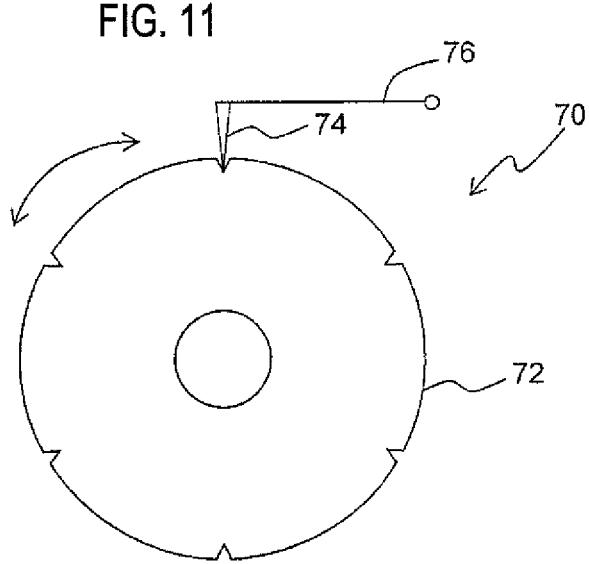
FIG. 11 is a conceptual view illustrating a click stop mechanism used in a third exemplary embodiment of the present invention.

In the meantime, in the above exemplary embodiments, the ratchet mechanism 50 permitting only the unidirectional rotation is used as the probe rotation holding mechanism. However, like a third exemplary embodiment shown in FIG. 11, a click stop mechanism 70 permitting bidirectional rotation and including a notched wheel 72 and a rotation stopper 74 configured to be urged towards the notched wheel 72 by a plate spring 76 may also be used.

Also, in the above exemplary embodiments, the contact probe is the ball probe, and the non-contact probe is the laser probe. However, the types of the probe are not limited thereto. For example, a hard probe other than the ball probe may be used as the contact probe, and an optical probe other than the laser probe may be used as the non-contact probe.

What is claimed is:
1. A multi-joint arm type measurement apparatus comprising:
   a plurality of probes mounted at a tip of a multi-joint mechanism, the plurality of probes including at least a first probe and a second probe; and a probe rotation holding mechanism configured to rotatably hold the first probe around the second probe, the probe rotation holding mechanism being configured to fix a rotating position of the first probe at a plurality of positions, the probe rotation holding mechanism including a click stop mechanism including: (i) a wheel formed with a plurality of notches, and (ii) a rotation stopper urged towards the wheel to be engaged with the plurality of notches so as to fix the rotating position of the first probe at the plurality of positions.

2. The multi-joint arm type measurement apparatus according to claim 1, wherein the second probe is a contact probe and the first probe is a non-contact probe.

3. The multi-joint arm type measurement apparatus according to claim 2, wherein the probe rotation holding mechanism is configured to rotate the non-contact probe around the contact probe.

4. The multi-joint arm type measurement apparatus according to claim 2, wherein the contact probe is a ball probe, and the non-contact probe is an optical probe.

5. A multi-joint arm type measurement apparatus comprising:
   a plurality of probes mounted at a tip of a multi-joint mechanism, the plurality of probes including at least a first probe and a second probe; and
   a probe rotation holding mechanism configured to rotatably hold the first probe around the second probe, the probe rotation holding mechanism being configured to fix a rotating position of the first probe at a plurality of positions, wherein the probe rotation holding mechanism includes a ratchet mechanism configured to fix the rotating position of the first probe at the plurality of positions.

6. The multi-joint arm type measurement apparatus according to claim 5, wherein the second probe is a contact probe and the first probe is a non-contact probe.

7. The multi-joint arm type measurement apparatus according to claim 6, wherein the probe rotation holding mechanism is configured to rotate the non-contact probe around the contact probe.

8. The multi-joint arm type measurement apparatus according to claim 6, wherein the contact probe is a ball probe, and the non-contact probe is an optical probe.

9. A multi-joint arm type measurement apparatus comprising:
   a plurality of probes mounted at a tip of a multi-joint mechanism, the plurality of probes including at least a first probe and a second probe; and
   a probe rotation holding mechanism configured to rotatably hold the first probe around the second probe, the probe rotation holding mechanism being configured to fix a rotating position of the first probe at a plurality of positions, wherein the probe rotation holding mechanism includes a rotary encoder configured to detect a rotating angle of the first probe relative to the second probe.

10. The multi-joint arm type measurement apparatus according to claim 9, wherein the second probe is a contact probe and the first probe is a non-contact probe.

11. The multi-joint arm type measurement apparatus according to claim 10, wherein the probe rotation holding mechanism is configured to rotate the non-contact probe around the contact probe.

12. The multi-joint arm type measurement apparatus according to claim 10, wherein the contact probe is a ball probe, and the non-contact probe is an optical probe.

* * * * *